United States Patent [19]
Masters et al.

[11] Patent Number: 5,788,250
[45] Date of Patent: Aug. 4, 1998

[54] HEADREST GUIDE SLEEVE

[75] Inventors: James Masters, Farmington Hills; Hongliang Chen, Detroit; Brian Fechner, Ann Arbor; Marcus Gorski, Livonia; Ted Grohs, Belleville; Ronald Lovasz, Allen Park; Todd Mysliwiec, Woodhaven; John Sims, Dearborn; Eric Spier, Southfield; Dave Williams, Redford; Dave Zimmerman, Woodhaven, all of Mich.

[73] Assignee: Lear Corporation, Southfield, Mich.

[21] Appl. No.: 622,461

[22] Filed: Mar. 25, 1996

[51] Int. Cl.⁶ ........................................ A47C 7/36
[52] U.S. Cl. ........................................ 297/410; 297/391
[58] Field of Search ........................ 297/410, 391, 297/353, 440.1, 440.24, 452.18, 463.1; 403/368, 369, 371

[56] References Cited

U.S. PATENT DOCUMENTS

| | | |
|---|---|---|
| 3,030,850 | 4/1962 | Minor et al. |
| 4,367,053 | 1/1983 | Stratienko . |
| 4,489,979 | 12/1984 | Zyngier . |
| 4,844,545 | 7/1989 | Ishii . |
| 4,854,642 | 8/1989 | Vidwans et al. . |
| 5,080,437 | 1/1992 | Pesta et al. . |
| 5,222,784 | 6/1993 | Hamelin . |
| 5,397,170 | 3/1995 | Shrock . |
| 5,445,434 | 8/1995 | Kohut . |

FOREIGN PATENT DOCUMENTS

| | | |
|---|---|---|
| 272852 | 7/1965 | Australia . |
| 2355483 | 6/1976 | France . |

*Primary Examiner*—Milton Nelson, Jr.
*Attorney, Agent, or Firm*—Howard & Howard

[57] ABSTRACT

A tubular bushing (26) assembly made of plastic material and disposed in an opening (24) defined by a pair of spaced sheets in a seat back (14) of an automotive vehicle to adjustably support each of the posts (22) of a headrest (20). The bushing (26) comprises an outer sleeve (28) presenting ribs (32, 34) for engaging the edges of the opening (24) in each of the sheets of the bracket of the seat back frame (18) and an inner sleeve (30) for insertion within said outer sleeve (28) for slidably supporting the post (22) and having hoop rings (46, 48) for forcing the outer sleeve (28) radially outwardly to deform the ribs (32, 34) about and into gripping engagement with the edges of the openings (24).

28 Claims, 2 Drawing Sheets

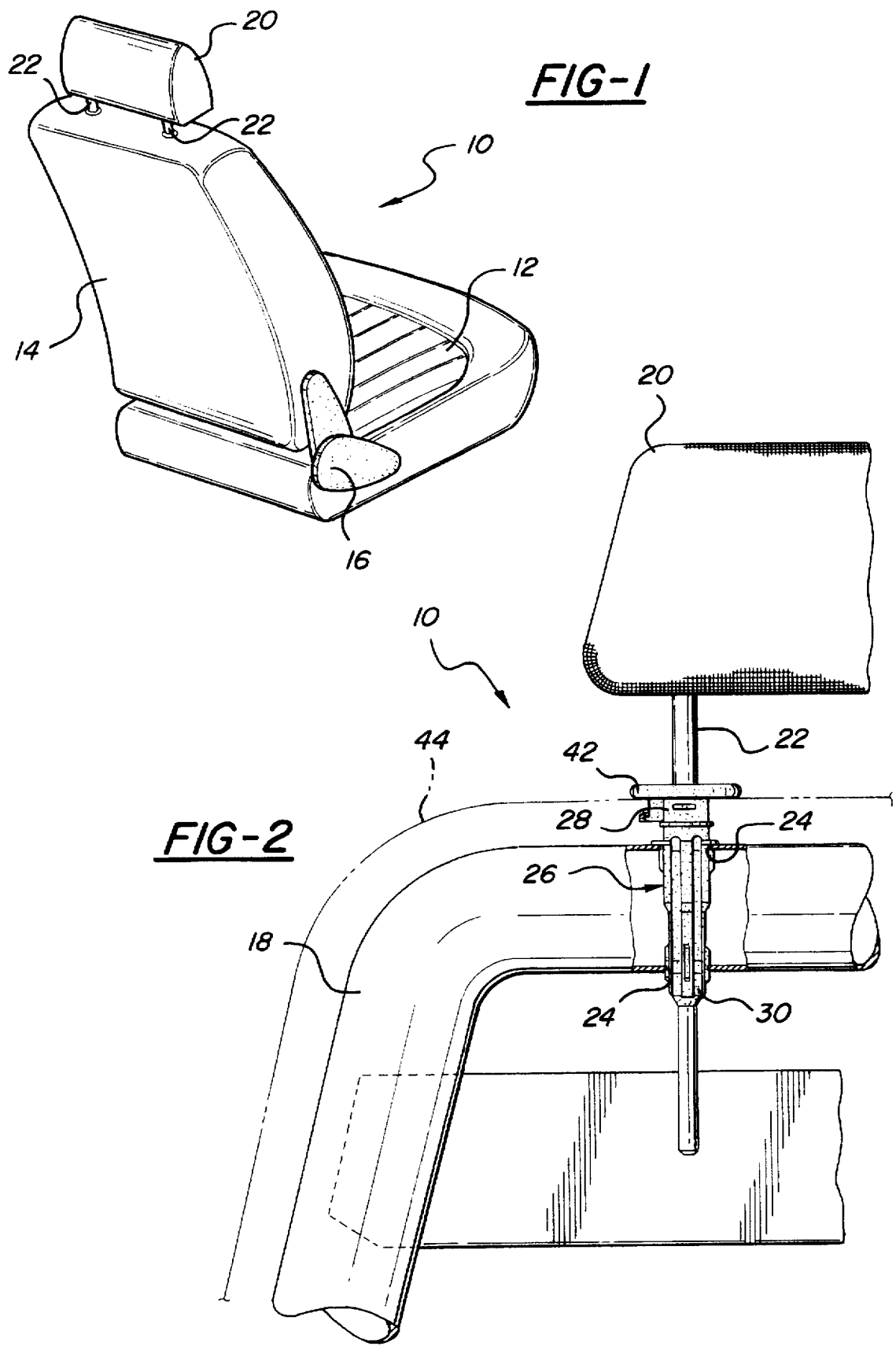

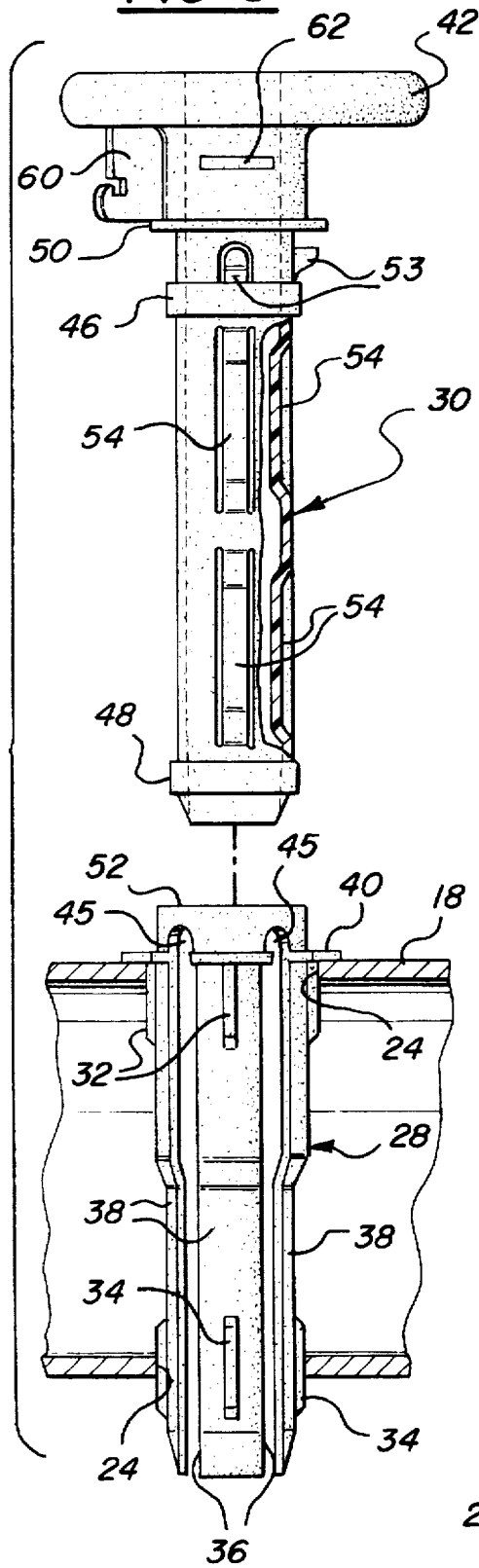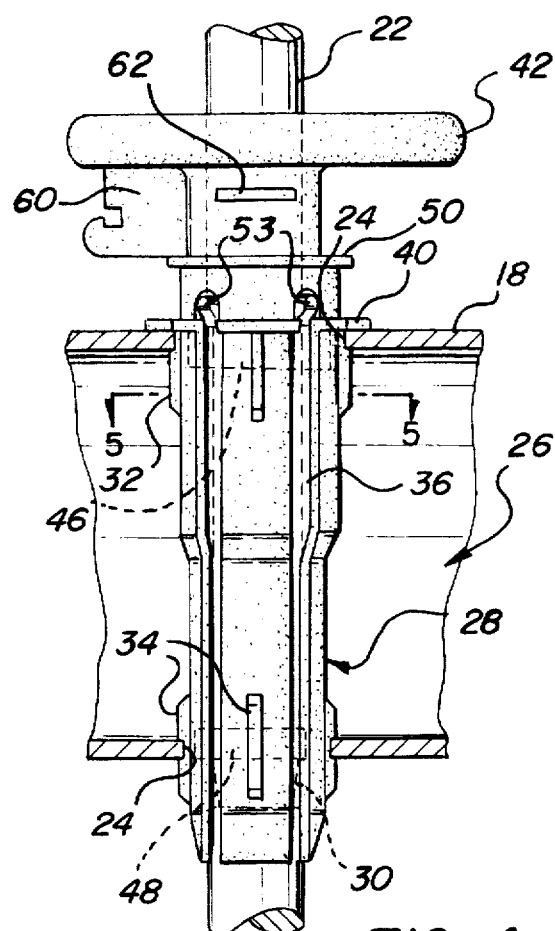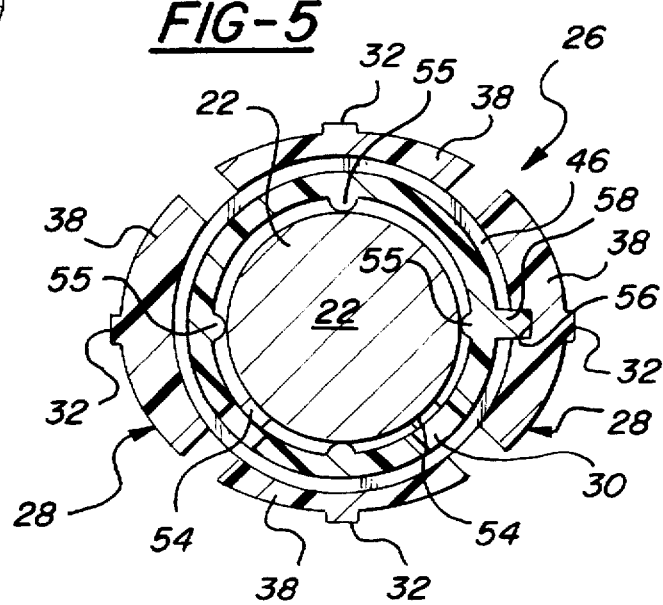

5,788,250

HEADREST GUIDE SLEEVE

TECHNICAL FIELD

This invention relates to headrests for automotive vehicle seats and, more particularly, to a bushing assembly for slidably guiding the support posts of the headrest.

BACKGROUND OF THE INVENTION

The manufacturers of motor vehicles provide head restraints, i.e., headrests, for occupant seats as a comfort and safety feature. One type of headrest includes a separate head restraint pad supported by a mechanism for allowing the adjustment of the vertical position of the pad for a particular seat occupant. This vertical adjustment mechanism typically includes one or more rods or posts extending downwardly from the head restraint pad and into the seatback, with the remainder of the mechanism mounted within the seatback for allowing the vertical adjustment and for maintaining the head restraint pad in the selected vertical position.

The posts are frequently supported in bushings which are, in turn, retained in the seatback frame. The stability of the posts is dependent upon the non-movability or cocking of the bushing relative to the seatback frame yet providing an interconnection between the bushing and the seatback frame which is capable of efficient and inexpensive manufacture and attachment to the seatback frame. Examples of such bushings known to the prior art are disclosed in U.S. Pat. Nos. 4,489,979 to Zyngier, 4,854,642 to Vidwans et al and 5,080,437 to Pesta et al.

SUMMARY OF THE INVENTION ADVANTAGES

A tubular bushing assembly is disposed in an opening in a seat back for an automotive vehicle to adjustably support the post of a headrest. The bushing comprises an outer sleeve for engaging the periphery of the opening in the seatback and an inner sleeve for insertion within the outer sleeve for slidably supporting the post and for forcing the outer sleeve radially outwardly into gripping engagement with the periphery of the opening.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an environmental view showing an automotive seat assembly with a headrest;

FIG. 2 is a fragmentary view showing the bushing of the subject invention installed in the seatback frame;

FIG. 3 is a fragmentary exploded view of the bushing of the subject invention; and FIG. 4 is a view similar to FIG. 3 but showing the bushing in the fully installed position relative to the seatback frame; and;

FIG. 5 is a cross sectional view taken substantially along line 5—5 of FIG. 4.

DETAILED DESCRIPTION OF THE PREFERRED EMBODIMENT

Referring to the Figures, wherein like numerals reference like or corresponding parts throughout the several views, an automotive seat assembly is generally shown at 10. The automotive seat assembly 10 comprises a generally horizontal seat 12, upon which, an occupant sits, and a seat back 14 pivotally supported on the seat 12 by the adjusting hinge mechanism 14. The seat back 16 includes a tubular frame 18, usually made of metal.

A headrest 20 is supported at the top of the seatback frame 18 by the posts or rods 22. The posts 22 support the headrest 14 on the seatback 20 for vertical adjustment. The seatback frame 18 includes a pair of holes or openings 24 extending therethrough with each opening 24 presenting a periphery for receiving one of the posts. Although the openings 24 are presented in a pair of spaced sheets defined by the tubular frame 18, they may be presented by a separate bracket which is, in turn, attached to the seatback frame 18; for example, the bracket shown in the aforesaid U.S. Pat. No. 4,854,642. In either case, a tubular bushing, generally indicated at 26, is disposed in each opening 24 and has a longitudinal bore for receiving the post.

The assembly is characterized by the bushing 26 including an outer sleeve 28 engaging the opening 24 and an inner sleeve 30 disposed within the outer sleeve 28 for slidably supporting the post 22 and forcing the outer sleeve 28 radially outwardly into gripping engagement with the periphery of the opening 24. The outer sleeve 28 includes one or more protrusions, defined by the upper 32 and lower 34 ribs, which are deformed against the periphery of the opening 24 by the inner sleeve 30. The outer sleeve 28 includes a plurality of longitudinal slots 36 dividing the outer sleeve 28 into a plurality of longitudinally extending legs 38, four such legs 38 in the illustrated embodiment. The longitudinally extending ribs 32 and 34 are disposed on the exterior of each of the legs 38, the upper ribs 32 being longitudinally spaced from the lower ribs 34. The opening 24 is defined by a pair of sheets, i.e., opposite sides of the tubular frame, spaced longitudinally along the outer sleeve 28. The outer sleeve 28 includes a positioning flange 40 extending radially in disc-like fashion annularly about the outer sleeve 28 for engaging the top one of the sheets or walls of the frame 18 to longitudinally position the outer sleeve 28 in the sheets of the frame. A head portion 42 is disposed at the upper end of the inner sleeve 30 for coacting with the cover or trim 44 of the seatback 14. The slots 36 extend longitudinally into the bottom end of the outer sleeve 28 and upwardly through and above the positioning flange 40 to catches 45 at the upper ends thereof, i.e., the slots 36 also extend radially into the positioning flange 40. As best shown in FIG. 3, the outer sleeve 28 has a larger diameter along the upper half than the diameter along the bottom half whereby the opening 24 in the bottom sheet is smaller in diameter than the opening in the upper sheet of the frame. When the outer sleeve 28 is inserted into the opening 24 in the seatback frame 18, the upper ribs 32 are aligned with the upper sheet and the lower ribs 34 are aligned with the lower sheet of the frame.

The inner sleeve 30 includes a pair of longitudinally spaced hoop sections providing an upper fixed radial ring 46 and a lower fixed radial ring 48. The upper ring 46 forces the upper rib or protrusion 32 radially into the periphery of the upper sheet defining the opening 24 and the lower ring 48 forces the lower rib or protrusion 34 radially into the periphery of the lower sheet defining the opening 24. Accordingly, the hoop sections or ring 46 and 48 are spaced along the inner sleeve 30 and are radially aligned with the sheets for deforming the ribs 32 and 34 about and into gripping engagement with the sheets. To this end, the inner sleeve 30 includes a stop 50 extending radially and engaging the top 52 of the outer sleeve 28 to longitudinally align the rings 46 and 48 with the sheets presented by the opening 24.

A a plurality of latches 53 extend radially outwardly from said inner sleeve 30 adjacent and below the stop 50 for snapping into interlocking engagement with the catches 45 at the upper ends of the slots 36. When thus engaged, the latches 53 prevent the inner sleeve 30 from being removed from the outer sleeve 28.

At least one spring tab 54 extends into the bore of the inner sleeve 30 and is integral with the inner sleeve 30 for engaging the rod 22 of the headrest 20. The spring tabs 54 apply a force to the post 22 to eliminate rattle and noise due to the head rest shaking in the sleeves 30 during movement of the vehicle. The tabs 54 are like bows in that they are integral at each end thereof with the inner sleeve 30 and extend or bow into the inner sleeve 30. There are two strings of such tabs 54, each string with two aligned tabs 54, and with the strings disposed circumferentially between sixty and ninety degrees apart. Cooperating with the tabs 54 to engage the post 22 are three longitudinally extending ridges 55 disposed circumferentially opposite the tabs 54 and ninety degrees apart. The ridges 55 force the post 22 into engagement with the tabs 54 and vice versa.

The outer sleeve 28 includes an alignment groove 56 for receiving an alignment rail 58 thereby circumferentially aligning the two sleeves as the inner sleeve 30 is inserted into the outer sleeve 28.

Each of the sleeves 28 and 30 is an integral member consisting of organic polymeric material, although the plastic materials from which the respective sleeves are made may differ in composition.

A stiffening flange 60 extends between the head 42 and the side of the outer sleeve 30 and, as is well known in the art, supports a spring clip in the opening in the flange 60 which spring clip, in turn, indexes the vertical height of the headrest by being biased into the slot 62 to engage the post 22.

In use, the outer sleeve 28 is first inserted into the opening 24 which presents two spaced sheets, as illustrated in FIG. 3. This is most easily accomplished before the seatback 14 is covered and trimmed. Either before or after the seatback is trimmed, the inner sleeve 30 is forced into the outer sleeve 28 to engage the stop flange 50 with the top 52 of the outer sleeve 30 to align the upper ring 46 with the upper sheet of the opening 24 and to align the lower ring 48 with the lower sheet of the opening 24 thereby to deform the upper ribs 32 about the edge of the upper sheet and to deform the lower ribs 34 about the edge of the lower sheet of the opening 24. Because of the hoop strength of the rings 46 and 48, the ribs are held in gripping engagement with the seatback frame 18 and are prevented from being inadvertently removed. The expansion of the outer sleeve 28 into the metal holes 24 takes up all of the tolerance variations in the sizes of the hole 24 to eliminate looseness existing in current mounting systems.

Accordingly, the invention includes a method of supporting the post 22 of a headrest 20 in an opening 24 presented by a seatback frame 18 of an automotive seat 10 by inserting a radially contractible outer sleeve 28 into the opening 24 and inserting an inner sleeve 30 having a hoop section defining a fixed radial ring 46 or 48 into the outer sleeve 28 to force the outer sleeve 28 outwardly into gripping engagement with the opening 24. The method is further defined as including the step of deforming ribs 32 and 34 on the exterior of the outer sleeve 28 about the edge of the opening 24 in the sheets of the frame 18 so that the edge of the opening 24 digs into the ribs 46 and 48. This is accomplished as the rings 46 and 48 are aligned with the edges of the sheets to maintain the ribs 32 and 34 in gripping engagement with the edge of the opening 24. Finally, the posts 22 of the headrest 20 are inserted into the inner sleeve 30 with the tabs 54 engaging the post 22 for sound deadening.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An automotive seat assembly (10) comprising:

a seat back frame (18);

a headrest (20);

at least one post (22) supporting said headrest (20) on said seat back frame (18) for vertical adjustment;

said seat back frame (18) presenting a circumferential inner periphery defining at least one opening (24) for receiving said post (22);

a tubular bushing (26) disposed in said opening (24) and having a bore for receiving said post (22);

said bushing (26) including an outer sleeve (28) engaging said opening (24) and an inner sleeve (30) disposed within said outer sleeve (28) for slidably supporting said post (22) and forcing said outer sleeve (28) radially outwardly into gripping engagement with said inner periphery of said opening (24); and said outer sleeve (28) including an outer tubular surface and at least one protrusion (32, 34) having a raised ridge extending radially from said outer tubular surface and longitudinally along said tubular surface which is deformed against said inner periphery of said opening (24).

2. An assembly as set forth in claim 1 wherein said inner sleeve (30) includes an outer tubular surface and at least one hoop section providing a fixed radial ring (46, 48) extending outwardly from said tubular surface forming a raised cylinder around a portion of said inner sleeve for forcing said protrusion (32, 34) radially into said inner periphery of said opening (24).

3. An assembly as set forth in claim 2 wherein said outer sleeve (28) includes a plurality of longitudinal slots (36) dividing said outer sleeve (28) into a plurality of longitudinally extending legs (38).

4. An assembly as set forth in claim 3 wherein said protrusion comprises a longitudinally extending rib (32, 34) disposed on the exterior of each of said legs (38).

5. An assembly as set forth in claim 4 wherein said opening (24) is defined by a pair of sheets spaced longitudinally along said outer sleeve (28), each of said sheets including an inner periphery defining said opening (24), said inner sleeve (30) including a pair of said raised cylindrical hoop sections (46, 48) spaced along said inner sleeve (30) and radially aligned with said sheets for deforming said ribs (32, 34) against and into gripping engagement with said inner periphery of each of said sheets.

6. An assembly as set forth in claim 5 wherein said outer sleeve (28) includes a positioning flange (40) extending radially from said outer tubular surface for engaging one of said sheets adjacent said opening to longitudinally position said outer sleeve (28) in said sheets.

7. An assembly as set forth in claim 6 wherein said inner sleeve (30) includes a stop (50) extending radially from said outer tubular surface and engaging said outer sleeve (28) to longitudinally align said cylindrical hoop sections (46, 48) with said inner periphery of said sheets.

8. An assembly as set forth in claim 7 wherein said outer sleeve (28) includes a top end and a bottom end, said slots (36) extend longitudinally into said bottom end of said outer sleeve (28) and upwardly through and above said positioning flange (40) to catches (45) at the ends thereof spaced below said top end of said outer sleeve.

9. An assembly as set forth in claim 8 including a plurality of latches (53) extending radially outwardly from said inner sleeve (30) adjacent said stop (50) for snapping into interlocking engagement with said catches (45) at the upper ends of said slots (36).

10. An assembly as set forth in claim 8 wherein the outer sleeve (28) includes an alignment rail (58) and an alignment groove (56) for receiving said alignment rail (58) thereby circumferentially aligning the two sleeves (28 & 30) as the inner sleeve (30) is inserted into the outer sleeve (28).

11. An assembly as set forth in claim 8 including a first plurality of said ribs (32) disposed about said outer sleeve (28) and engaging one of said sheets and a second plurality of said ribs (34) disposed about said outer sleeve (28) and engaging the other of said sheets.

12. An assembly as set forth in claim 8 wherein each of said sleeves is an integral member consisting of organic polymeric material.

13. An assembly as set forth in claim 8 including a pair of spring tabs (54) extending into said bore from said inner sleeve (30) for engaging said post (22).

14. An assembly as set forth in claim 13 including three longitudinally extending ridges (55) disposed circumferentially opposite said spring tabs (54) and ninety degrees apart for forcing the post (22) into engagement with said tabs (54), and vice versa.

15. A tubular bushing (26) assembly disposed in an opening (24) in a seat back frame (18) for an automotive vehicle having a bore to receive and adjustably support at least one post (22) of a headrest (20), said bushing (260 comprising:

an outer sleeve (28) including an outer tubular surface and at least one protrusion (32, 34) having a raised ridge extending radially from and longitudinally along said tubular surface for engaging the inner periphery of the opening (24) in the seat back and an inner sleeve (30) for insertion within said outer sleeve (28) for slidably supporting the post (22) and for forcing said outer sleeve (28) radially outwardly into gripping engagement with the inner periphery of the opening (24), said inner sleeve including an outer tubular surface and at least one hoop section providing a fixed radial ring (46, 48) extending outwardly from said tubular surface forming a raised cylinder around a portion of said inner sleeve for forcing said protrusion (32, 34) radially outwardly to deform said protrusion against the inner periphery of the opening (24).

16. An assembly as set forth in claim 15 wherein said outer sleeve (28) includes a plurality of longitudinal slots (36) dividing said outer sleeve (28) into a plurality of longitudinally extending legs (38).

17. An assembly as set forth in claim 16 wherein said protrusion comprises a longitudinally extending rib (32, 34) disposed on the exterior of each of said legs (38).

18. An assembly as set forth in claim 17 wherein said inner sleeve (30) includes a pair of said hoop sections (46, 48) spaced longitudinally along said inner sleeve (30) for radial alignment with a pair of sheets presented by the seat back frame (18) and spaced longitudinally along said outer sleeve (28) for forcing said ribs (32, 34) into gripping engagement with the sheets.

19. An assembly as set forth in claim 18 including a pair of spring tabs (54) extending into said bore from said inner sleeve (30) for engaging the post (22).

20. An assembly as set forth in claim 19 including three longitudinally extending ridges (55) disposed circumferentially opposite said spring tabs (54) and ninety degrees apart for forcing the post (22) into engagement with said tabs (54), and vice versa.

21. An assembly as set forth in claim 18 wherein each of said sleeves is an integral member consisting of organic polymeric material.

22. An assembly as set forth in claim 18 wherein said outer sleeve (28) includes a positioning flange (40) extending radially for engaging one of the sheets to longitudinally position said outer sleeve (28) in the sheets.

23. An assembly as set forth in claim 22 wherein said inner sleeve (30) includes a stop (50) extending radially for engaging said outer sleeve (28) to longitudinally align said hoop sections (46, 48) with the sheets.

24. An assembly as set forth in claim 23 wherein said slots (36) extend longitudinally into the bottom end of said outer sleeve (28) and upwardly through and above said positioning flange (40) to catches (45) at the ends thereof.

25. An assembly as set forth in claim 24 including a plurality of latches (53) extending radially outwardly from said inner sleeve (30) adjacent said stop (50) for snapping into interlocking engagement with said catches (45) at the upper ends of said slots (36).

26. An assembly as set forth in claim 18 including a first plurality of said ribs (32) disposed about said outer sleeve (28) for engaging one of the sheets and a second plurality of said ribs (34) disposed about said outer sleeve (28) for engaging the other of the sheets.

27. An automotive seat assembly comprising:

a seat back frame;

a headrest;

at least one post supporting said headrest on said seat back frame for vertical adjustment;

said seat back frame presenting a circumferential inner periphery defining at least one opening for receiving said post;

a tubular bushing disposed in said opening and having a bore for receiving said post;

said bushing including an outer sleeve engaging said opening and an inner sleeve disposed within said outer sleeve for slidably supporting said post and forcing said outer sleeve radially outwardly into gripping engagement with said periphery of said opening;

said outer sleeve having a top end and a bottom end and a plurality of slots extending longitudinally into said bottom end and upwardly to catches at the ends thereof spaced below said top end;

said inner sleeve having a top end and a bottom end and a plurality of latches extending radially outwardly from said inner sleeve adjacent said top end for snapping into interlocking engagement with said catches at the upper ends of said slots.

28. A tubular bushing assembly disposed in an opening in a seat back frame for an automotive vehicle having a bore to receive and adjustably support at least one post of a headrest, said bushing assembly comprising:

an outer sleeve for engaging an inner periphery of the opening in the seat back and an inner sleeve for insertion within said outer sleeve for slidably supporting the post and for forcing said outer sleeve radially outwardly into gripping engagement with the inner periphery of the opening;

said outer sleeve having a top end and a bottom end and a plurality of slots extending longitudinally into said bottom end and upwardly to catches at the ends thereof spaced below said top end;

said inner sleeve having a top end and a bottom end and a plurality of latches extending radially outwardly from said inner sleeve adjacent said top end for snapping into interlocking engagement with said catches at the upper ends of said slots.

* * * * *